United States Patent
Hauck et al.

(10) Patent No.: US 9,788,209 B2
(45) Date of Patent: *Oct. 10, 2017

(54) APPARATUS AND METHODS FOR CONTROLLING DISTRIBUTION OF ELECTRONIC ACCESS CLIENTS

(71) Applicant: Apple Inc., Cupertino, CA (US)

(72) Inventors: Jerrold Von Hauck, Windermere, FL (US); David T. Haggerty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,306

(22) Filed: Sep. 12, 2016

(65) Prior Publication Data

US 2017/0006473 A1  Jan. 5, 2017

Related U.S. Application Data

(63) Continuation of application No. 13/080,558, filed on Apr. 5, 2011, now Pat. No. 9,450,759.

(51) Int. Cl.
*H04W 12/08* (2009.01)
*H04L 9/32* (2006.01)
(Continued)

(52) U.S. Cl.
CPC .......... *H04W 12/08* (2013.01); *H04L 9/3228* (2013.01); *H04L 9/3247* (2013.01);
(Continued)

(58) Field of Classification Search
CPC ..... H04W 12/08; H04W 8/183; H04W 12/06; H04W 12/12; H04W 8/265; H04L 9/3247; H04L 9/3226
See application file for complete search history.

(56) References Cited

U.S. PATENT DOCUMENTS

| 3,876,942 A | 4/1975 | Koster et al. |
| 5,386,455 A | 1/1995 | Cooper et al. |

(Continued)

FOREIGN PATENT DOCUMENTS

| BR | PI0721720 A2 | 2/2013 |
| CN | 101222723 A | 7/2008 |

(Continued)

OTHER PUBLICATIONS

Kasper et al. "Subscriber Authentication in Cellular Networks with Trusted Virtual SIMs", Advanced Communication Technology, 2008. ICACT 2008. 1oth International Conference (vol. 2 ), pp. 903-908.

(Continued)

*Primary Examiner* — Farid Homayounmehr
*Assistant Examiner* — Zhimei Zhu
(74) *Attorney, Agent, or Firm* — Downey Brand LLP (57) ABSTRACT

Apparatus and methods for controlling the distribution of electronic access clients to a device. In one embodiment, a virtualized Universal Integrated Circuit Card (UICC) can only load an access client such as an electronic Subscriber Identity Module (eSIM) according to an activation ticket. The activation ticket ensures that the virtualized UICC can only receive eSIMs from specific carriers ("carrier locking"). Unlike prior art methods which enforce carrier locking on a software application launched from a software chain of trust (which can be compromised), the present invention advantageously enforces carrier locking with the secure UICC hardware which has, for example, a secure code base.

20 Claims, 4 Drawing Sheets

(51) Int. Cl.
*H04L 29/06* (2006.01)
*H04W 12/06* (2009.01)
*H04W 4/00* (2009.01)
*H04W 8/24* (2009.01)
*H04W 8/18* (2009.01)
*H04W 12/04* (2009.01)
*H04W 12/12* (2009.01)

(52) U.S. Cl.
CPC ........ *H04L 63/061* (2013.01); *H04L 63/0869* (2013.01); *H04W 4/003* (2013.01); *H04W 8/183* (2013.01); *H04W 8/245* (2013.01); *H04W 12/04* (2013.01); *H04W 12/06* (2013.01); *H04L 2209/80* (2013.01); *H04W 12/12* (2013.01)

(56) References Cited

U.S. PATENT DOCUMENTS

| | | |
|---|---|---|
| 5,835,061 A | 11/1998 | Stewart |
| 6,052,604 A | 4/2000 | Bishop et al. |
| 6,061,740 A | 5/2000 | Ferguson et al. |
| 6,134,435 A | 10/2000 | Zicker et al. |
| 6,137,783 A | 10/2000 | Sallberg et al. |
| 6,185,427 B1 | 2/2001 | Krasner et al. |
| 6,199,045 B1 | 3/2001 | Giniger et al. |
| 6,259,405 B1 | 7/2001 | Stewart et al. |
| 6,263,214 B1 | 7/2001 | Yazaki et al. |
| 6,323,846 B1 | 11/2001 | Westerman et al. |
| 6,456,234 B1 | 9/2002 | Johnson |
| 6,487,403 B2 | 11/2002 | Carroll |
| 6,570,557 B1 | 5/2003 | Westerman et al. |
| 6,611,687 B1 | 8/2003 | Clark et al. |
| 6,615,213 B1 | 9/2003 | Johnson |
| 6,677,894 B2 | 1/2004 | Sheynblat et al. |
| 6,677,932 B1 | 1/2004 | Westerman |
| 6,731,238 B2 | 5/2004 | Johnson |
| 6,879,825 B1 | 4/2005 | Daly |
| 6,888,536 B2 | 5/2005 | Westerman et al. |
| 7,054,642 B1 | 5/2006 | Matz et al. |
| 7,181,017 B1 | 2/2007 | Nagel et al. |
| 7,187,997 B2 | 3/2007 | Johnson |
| 7,225,337 B2 | 5/2007 | Baessler |
| 7,442,521 B2 | 10/2008 | Lukyanov et al. |
| 7,653,037 B2 | 1/2010 | Prakash et al. |
| 7,757,276 B1 | 7/2010 | Lear |
| 7,797,552 B2 | 9/2010 | Kahn et al. |
| 7,929,959 B2 | 4/2011 | De Atley et al. |
| 7,940,932 B2 | 5/2011 | Paksoy et al. |
| 8,060,060 B1 | 11/2011 | Schempp et al. |
| 8,195,147 B2 | 6/2012 | Bonnet et al. |
| 8,620,216 B2 | 12/2013 | Castrogiovanni et al. |
| 2002/0082048 A1 | 6/2002 | Toyoshima |
| 2002/0085530 A1 | 7/2002 | Toyoshima |
| 2002/0197992 A1 | 12/2002 | Nizri et al. |
| 2003/0083068 A1 | 5/2003 | Wong |
| 2003/0119515 A1 | 6/2003 | Holler et al. |
| 2003/0126245 A1 | 7/2003 | Feltin et al. |
| 2004/0023647 A1* | 2/2004 | Mazzara, Jr. ........ H04B 7/1853 455/419 |
| 2004/0092248 A1 | 5/2004 | Kelkar et al. |
| 2004/0102183 A1 | 5/2004 | Haub et al. |
| 2004/0114615 A1 | 6/2004 | Virtanen et al. |
| 2004/0121802 A1 | 6/2004 | Kim et al. |
| 2004/0142725 A1 | 7/2004 | Kim |
| 2004/0176133 A1 | 9/2004 | Lipsit |
| 2004/0176134 A1 | 9/2004 | Goldthwaite et al. |
| 2004/0205164 A1* | 10/2004 | Jacobs .............. H04M 1/72525 709/219 |
| 2004/0233893 A1 | 11/2004 | Zhou et al. |
| 2004/0235458 A1 | 11/2004 | Walden et al. |
| 2004/0242224 A1 | 12/2004 | Janik et al. |
| 2004/0248850 A1 | 12/2004 | Ernst et al. |
| 2005/0009502 A1 | 1/2005 | Little et al. |
| 2005/0054338 A1 | 3/2005 | Hosokawa |
| 2005/0079863 A1 | 4/2005 | Macaluso |
| 2005/0120209 A1 | 6/2005 | Kwon et al. |
| 2005/0141438 A1 | 6/2005 | Quetglas et al. |
| 2005/0153741 A1 | 7/2005 | Chen et al. |
| 2005/0164737 A1 | 7/2005 | Brown |
| 2005/0239498 A1 | 10/2005 | Dorenbosch et al. |
| 2006/0035631 A1 | 2/2006 | White et al. |
| 2006/0046717 A1 | 3/2006 | Bovell et al. |
| 2006/0059341 A1 | 3/2006 | Dharmadhikari et al. |
| 2006/0135144 A1 | 6/2006 | Jothipragasam |
| 2006/0143098 A1 | 6/2006 | Lazaridis |
| 2006/0154647 A1 | 7/2006 | Choi |
| 2006/0205434 A1 | 9/2006 | Tom et al. |
| 2006/0229071 A1 | 10/2006 | Haverinen et al. |
| 2006/0288407 A1 | 12/2006 | Naslund et al. |
| 2007/0004386 A1 | 1/2007 | Singh et al. |
| 2007/0021109 A1 | 1/2007 | Zellner |
| 2007/0036110 A1 | 2/2007 | Preguica |
| 2007/0082655 A1 | 4/2007 | Link et al. |
| 2007/0149170 A1 | 6/2007 | Bloebaum et al. |
| 2007/0153768 A1 | 7/2007 | Jagadesan et al. |
| 2007/0167182 A1 | 7/2007 | Tenhunen et al. |
| 2007/0177562 A1 | 8/2007 | Castrogiovanni et al. |
| 2008/0003980 A1 | 1/2008 | Voss et al. |
| 2008/0005577 A1 | 1/2008 | Rager et al. |
| 2008/0014928 A1 | 1/2008 | Chen |
| 2008/0032682 A1 | 2/2008 | Jung et al. |
| 2008/0051062 A1 | 2/2008 | Lee |
| 2008/0089276 A1 | 4/2008 | Ito et al. |
| 2008/0166993 A1 | 7/2008 | Gautier et al. |
| 2008/0167027 A1 | 7/2008 | Gautier et al. |
| 2008/0167036 A1 | 7/2008 | Bush et al. |
| 2008/0182615 A1 | 7/2008 | Xue et al. |
| 2008/0242285 A1 | 10/2008 | Riffe et al. |
| 2008/0243699 A1 | 10/2008 | Hilerio et al. |
| 2008/0244685 A1 | 10/2008 | Andersson et al. |
| 2008/0261561 A1 | 10/2008 | Gehrmann |
| 2008/0267114 A1 | 10/2008 | Mukherjee et al. |
| 2008/0268813 A1 | 10/2008 | Maes |
| 2008/0268866 A1 | 10/2008 | Sukkarie |
| 2008/0318550 A1 | 12/2008 | DeAtley |
| 2009/0006852 A1* | 1/2009 | Qiu ...................... H04L 9/3226 713/176 |
| 2009/0061781 A1 | 3/2009 | Zhang |
| 2009/0061840 A1 | 3/2009 | Fleischman et al. |
| 2009/0061934 A1 | 3/2009 | Hauck et al. |
| 2009/0172419 A1 | 7/2009 | Takayama |
| 2009/0181662 A1 | 7/2009 | Fleischman et al. |
| 2009/0191918 A1 | 7/2009 | Mardiks |
| 2009/0205028 A1 | 8/2009 | Smeets et al. |
| 2009/0235351 A1 | 9/2009 | Brown et al. |
| 2009/0285166 A1 | 11/2009 | Huber et al. |
| 2009/0305732 A1 | 12/2009 | Marcellino et al. |
| 2010/0029247 A1 | 2/2010 | De Atley et al. |
| 2010/0161966 A1 | 6/2010 | Kwon et al. |
| 2010/0210304 A1 | 8/2010 | Huslak |
| 2010/0210306 A1 | 8/2010 | Larsson |
| 2010/0285834 A1 | 11/2010 | Hutchison, IV |
| 2010/0306076 A1 | 12/2010 | Taveau et al. |
| 2010/0311468 A1 | 12/2010 | Shi et al. |
| 2010/0325723 A1* | 12/2010 | Essawi ................ H04L 9/3226 726/20 |
| 2011/0004549 A1* | 1/2011 | Gray ................... G06Q 20/102 705/40 |
| 2011/0076986 A1* | 3/2011 | Glendinning ........... G06F 21/88 455/411 |
| 2011/0092185 A1 | 4/2011 | Garskof |
| 2011/0093339 A1 | 4/2011 | Morton |
| 2011/0151836 A1 | 6/2011 | Dadu et al. |
| 2011/0165872 A1 | 7/2011 | Ohno et al. |
| 2011/0306318 A1 | 12/2011 | Rodgers et al. |
| 2012/0028604 A1 | 2/2012 | Walden et al. |
| 2012/0047227 A1 | 2/2012 | Haggerty et al. |
| 2012/0102313 A1 | 4/2012 | Nicolson et al. |
| 2012/0108204 A1 | 5/2012 | Schell et al. |
| 2012/0108205 A1 | 5/2012 | Schell et al. |
| 2012/0108206 A1 | 5/2012 | Haggerty |
| 2012/0108207 A1 | 5/2012 | Schell et al. |

(56) References Cited

U.S. PATENT DOCUMENTS

| | | | |
|---|---|---|---|
| 2012/0108295 A1 | 5/2012 | Schell et al. | |
| 2012/0115441 A1 | 5/2012 | Schell | |
| 2012/0117635 A1 | 5/2012 | Schell et al. | |
| 2012/0124388 A1 | 5/2012 | Chng et al. | |
| 2012/0135710 A1 | 5/2012 | Schell et al. | |
| 2012/0149329 A1 | 6/2012 | Mahmood et al. | |
| 2012/0260095 A1 | 10/2012 | Von Hauck et al. | |
| 2012/0309355 A1 | 12/2012 | Pudney et al. | |
| 2013/0205134 A1* | 8/2013 | Holtmanns | H04W 4/001 713/156 |
| 2017/0006473 A1 | 1/2017 | Hauck et al. | |

FOREIGN PATENT DOCUMENTS

| | | |
|---|---|---|
| DE | 19823074 A1 | 11/1999 |
| DE | 10215861 A1 | 8/2003 |
| DE | 10342530 A1 | 4/2005 |
| EP | 0337361 A2 | 10/1989 |
| EP | 0971551 A2 | 1/2000 |
| EP | 1276339 A1 | 1/2003 |
| EP | 1679925 A1 | 7/2006 |
| EP | 1727383 A1 | 11/2006 |
| EP | 1748661 A1 | 1/2007 |
| EP | 1865437 A2 | 12/2007 |
| EP | 1870814 A1 | 12/2007 |
| EP | 1998580 A2 | 12/2008 |
| EP | 2076071 A1 | 7/2009 |
| EP | 2079256 A1 | 7/2009 |
| EP | 2373074 A1 | 10/2011 |
| EP | 2410777 A1 | 1/2012 |
| EP | 2448215 A1 | 5/2012 |
| EP | 2448216 A1 | 5/2012 |
| EP | 2509342 A2 | 10/2012 |
| EP | 2509352 A2 | 10/2012 |
| ES | 2404290 T3 | 5/2013 |
| GB | 2381418 A | 4/2003 |
| GB | 2428544 A | 1/2007 |
| JP | 2006119727 A | 5/2006 |
| JP | 2006295684 A | 10/2006 |
| JP | 2007134797 A | 5/2007 |
| JP | 2007235492 A | 9/2007 |
| JP | 2007335997 A | 12/2007 |
| JP | 2009517937 A | 4/2009 |
| JP | 2010532107 A | 9/2010 |
| KR | 20100050565 A | 5/2010 |
| TW | 200404448 A | 3/2004 |
| TW | 200806057 A | 1/2008 |
| TW | 200829040 A | 7/2008 |
| WO | 9742783 A2 | 11/1997 |
| WO | 0115414 A1 | 3/2001 |
| WO | 02019664 A2 | 3/2002 |
| WO | 02021872 A1 | 3/2002 |
| WO | 02058361 A2 | 7/2002 |
| WO | 03041443 A | 5/2003 |
| WO | 03077585 A1 | 9/2003 |
| WO | 03079628 A1 | 9/2003 |
| WO | 2004057485 A1 | 7/2004 |
| WO | 2004082310 A1 | 9/2004 |
| WO | 2004105421 A2 | 12/2004 |
| WO | 2006054980 A1 | 5/2006 |
| WO | 2006084183 A1 | 8/2006 |
| WO | 2006089065 A1 | 8/2006 |
| WO | 2007062882 A2 | 6/2007 |
| WO | 2007079425 A2 | 7/2007 |
| WO | 2008086255 A2 | 7/2008 |
| WO | 2008157576 A1 | 12/2008 |
| WO | 2009002649 A2 | 12/2008 |
| WO | 2009032853 A1 | 3/2009 |
| WO | 2009051377 A1 | 4/2009 |
| WO | 2009082759 A1 | 7/2009 |
| WO | 2009092115 A2 | 7/2009 |
| WO | 2009141764 A2 | 11/2009 |
| WO | 2010102236 A2 | 9/2010 |
| WO | 2010123890 A1 | 10/2010 |
| WO | 2011159549 A1 | 12/2011 |

OTHER PUBLICATIONS

TCG MPWG Mobile Reference Architecture. Specification version 1.0 Revision 1, TCG, Jun. 12, 2007 (Jun. 12, 2007), pp. 1-87, XP002516393, Retrieved from the internet: URL: https://www.trustedcomputinggroup.org/specs/rnobilephone/tcg-mobile-reference architecture-1.0.pdf [retrieved on Feb. 23, 2009 (Feb. 23, 2009)].

3GPP TS 35.205V9.0.0, "Specification of the MILENAGE Algorithm Set: An example algorithm set of the 3GPP authentication and key generation functions f2, f1, f2, f3,f4,f5 and f5", Dec. 31, 2009.

* cited by examiner

APPARATUS AND METHODS FOR CONTROLLING DISTRIBUTION OF ELECTRONIC ACCESS CLIENTS

CROSS-REFERENCE TO RELATED APPLICATIONS

This application is a continuation of U.S. application Ser. No. 13/080,558, filed Apr. 5, 2011, the content of which is incorporated herein by reference in its entirety for all purposes.

RELATED APPLICATIONS

This application is related to co-owned, co-pending U.S. patent application Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 12/980,232 filed on Dec. 28, 2010 and entitled "VIRTUAL SUBSCRIBER IDENTITY MODULE DISTRIBUTION SYSTEM", and Ser. No. 12/353,227 filed on Jan. 13, 2009, and entitled "POSTPONED CARRIER CONFIGURATION", and U.S. Provisional Patent Application Ser. No. 61/472,109 filed on Apr. 5, 2011, and entitled "APPARATUS AND METHODS FOR STORING ELECTRONIC ACCESS CLIENTS", 61/472,115 filed on Apr. 5, 2011, and entitled "APPARATUS AND METHODS FOR DISTRIBUTING AND STORING ELECTRONIC ACCESS CLIENTS", 61/407,858 filed on Oct. 28, 2010 and entitled "METHODS AND APPARATUS FOR ACCESS CONTROL CLIENT ASSISTED ROAMING", 61/407,861 filed on Oct. 28, 2010 and entitled "MANAGEMENT SYSTEMS FOR MULTIPLE ACCESS CONTROL ENTITIES" (now U.S. patent application Ser. No. 13/079,614 filed on Apr. 4, 2011, of the same title"), 61/407,862 filed on Oct. 28, 2010 and entitled "METHODS AND APPARATUS FOR DELIVERING ELECTRONIC IDENTIFICATION COMPONENTS OVER A WIRELESS NETWORK", 61/407,866 filed on Oct. 28, 2010 and entitled "METHODS AND APPARATUS FOR STORAGE AND EXECUTION OF ACCESS CONTROL CLIENTS" (now U.S. patent application Ser. No. 13/080,521 filed on Apr. 5, 2011, of the same title), 61/408,504 filed on Oct. 29, 2010 and entitled "ACCESS DATA PROVISIONING SERVICE" (now U.S. patent application Ser. No. 13/078,811 filed on Apr. 1, 2011, and entitled "ACCESS DATA PROVISIONING APPARATUS AND METHODS"), 61/409,891 filed on Nov. 3, 2010 and entitled "METHODS AND APPARATUS FOR ACCESS DATA RECOVERY FROM A MALFUNCTIONING DEVICE", 61/410,298 filed on Nov. 4, 2010 and entitled "SIMULACRUM OF PHYSICAL SECURITY DEVICE AND METHODS" (now U.S. patent application Ser. No. 13/080,533 filed on Apr. 5, 2011, of the same title), and 61/413,317 filed on Nov. 12, 2010 and entitled "APPARATUS AND METHODS FOR RECORDATION OF DEVICE HISTORY ACROSS MULTIPLE SOFTWARE EMULATION", each of the foregoing being incorporated herein by reference in its entirety.

BACKGROUND OF THE INVENTION

1. Field of Invention

The present invention relates generally to the field of communications systems, and more particularly in one exemplary aspect to controlling the distribution of user access clients to devices.

2. Description of Related Technology

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM access control client authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CSIM), IP Multimedia Services Identity Module (ISIM), Subscriber Identity Modules (SIM), Removable User Identity Modules (RUIM), etc.

Traditionally, the USIM (or more generally "SIM") performs the well known Authentication and Key Agreement (AKA) procedure, which verifies and decrypts the applicable data and programs to ensure secure initialization. Specifically, the USIM must both (i) successfully answer a remote challenge to prove its identity to the network operator, and (ii) issue a challenge to verify the identity of the network.

Prior art SIM operation allows a subscriber to change between multiple different phones for a carrier network. Specifically, the subscriber information (e.g., billing account, phone number, etc.) is tied to the SIM card, not the phone itself. However, in some business models, mobile phones are heavily subsidized by the carrier; in order to recoup the cost of the subsidy, the subscriber is "locked" to the carrier for a minimum term.

Existing solutions have proven to be ineffective for preventing illicit "breaking" of subsidy-locked devices; i.e., customers may hack the device software and disable the subsidy lock. A high end phone that has been obtained or purchased at subsidized value and broken can be illegally resold at a profit. Consequently, a new black market has arisen for "broken" high end phones which can be used with any carrier.

Accordingly, new solutions are needed for enforcing subsidy locking. Ideally, such solutions should prevent use or activation of a device with an unauthorized user access client. Moreover, the improved methods and apparatus ideally would not rely on unsecured or lightly secured device hardware or software (i.e., elements which can be broken).

SUMMARY OF THE INVENTION

The present invention addresses the foregoing needs by providing, inter alia, apparatus and methods for controlling the distribution of user access clients to devices.

In one aspect of the present invention, a wireless apparatus is disclosed. In one embodiment, the wireless apparatus comprises: a wireless interface; one or more processors; and a secure element, comprising a secure processor and a secure storage device in data communication with the secure processor. The storage device includes computer-executable instructions that are configured to, when executed by the secure processor: receive an activation ticket, the activation ticket comprising one or more unbreak records associated with the one or more processors; verify the received activation ticket; and upon successful verification, enable at least one processor of the one or more processors.

In a first variant of the apparatus, the one or more processors comprise an application processor, and one or more baseband processors. In one such variant, the verification of the received activation ticket includes checking for one or more unbreak records for the application processor, and the baseband processor. In another such variant the verification of the received activation ticket includes checking for an unbreak record for the secure processor.

In a second variant, the activation ticket includes a digital signature signed by a trusted signatory. In one such variant, the verification of the received activation ticket includes verifying the digital signature.

In a third variant of the apparatus, the wireless interface is additionally configured to communicate with a cellular network. In one such variant, the verification of the received activation ticket includes checking the cellular network identity. In an alternate variant, the secure element is further configured to execute a user access control client. In one such variant, the user access control client is an electronic Subscriber Identity Module (eSIM), where the eSIM authenticates the wireless apparatus to the cellular network.

In another aspect of the present invention, a secure element is disclosed. In one exemplary embodiment, the secure element includes: an interface to one or more processing elements; a secure processor in sole communication with a first and second secure storage element; wherein the first secure storage element is configured to store at least one access control client. The access control client includes a first computer-executable instructions which, when executed by the secure processor, authenticate the at least one access control client to at least one cellular network. The second secure storage element includes a second computer-executable instructions that are configured for sole execution by the secure processor, and which when executed by the secure processor: verify an activation ticket; and upon successful verification of the activation ticket, enable the first secure storage element.

In one variant of the secure element, the second computer-executable instructions additionally comprise instructions, which when executed by the secure processor enables the one or more processing elements.

In some variants, the activation ticket includes one or more unbreak records for at least the secure processor. Alternately, the activation ticket includes a digital signature signed by a trusted signatory.

In yet other variants of the secure element, the activation ticket further includes one or more operational limitations. In one such variant one operational limitation allows or restricts one or more cellular networks. In another such variant, one operational limitation enables only a subset of the one or more processing elements.

In a third aspect of the present invention, a method for enforcing security for a cellular device is disclosed. In one embodiment, the method includes: receiving an activation ticket, the activation ticket comprising one or more unbreak records, each unbreak record specific to one or more processing elements of the cellular device; verifying an activation ticket; and if the activation ticket is successfully verified, enabling the one or more processing elements; wherein the verification of the activation ticket is performed by a secure element of the cellular device.

In one variant of the method, the method additionally includes transmitting a request for the activation ticket from a mobile services application, the mobile services application in communication with an activation service. For example, in one such variant, the mobile services application is executing on a computer connected to the cellular device. Alternately, the mobile services application is executing on the cellular device.

In a second variant, the request includes one or more unique identifiers associated with the one or more processing elements. Alternately, the request includes a desired cellular network. In another alternate, the request includes one or more user information such as billing information.

In a third variant of the method, the verification includes checking the activation ticket for one or more unbreak records, wherein each unbreak record identifies at least one processing element. In a fourth variant, the verification includes checking the activation ticket for an unbreak record for the secure processor. In yet a fifth variant, the verification includes checking a digital signature signed by a trusted signatory. In one such variant, the trusted signatory is the activation service.

In a sixth variant, the method additionally requests one or more user access control clients. In one such variant, the one or more user access control clients are adapted to authenticate the cellular device to a network.

In a fourth aspect of the invention, a system for controlling the distribution of user access clients to devices is disclosed.

In a fifth aspect of the invention, a computer readable apparatus is disclosed.

Further features of the present invention, its nature and various advantages will be made apparent from the accompanying drawings and the following detailed description.

DETAILED DESCRIPTION OF THE INVENTION

Reference is now made to the drawings wherein like numbers refer to like parts throughout.

Overview

The present invention provides, inter alia, methods and apparatus for controlling the distribution of user access clients to devices. In one embodiment, an electronic or virtualized Universal Integrated Circuit Card (eUICC) can only load an electronic Subscriber Identity Module (eSIM) according to an activation ticket. The activation ticket ensures that the eUICC can only use eSIMs appropriate to specific authorized carriers. Unlike prior art methods which enforce subsidy locking via software and hardware which can be compromised (e.g., the application processor, the baseband processor, etc.), the present invention enforces subsidy locking via the secure eUICC.

In one embodiment, a mobile device composed of a number of processing elements and a secure processor, requires an activation ticket to unlock the processing elements. The activation ticket is verified by the secure processor to enable or disable operation of the processing elements. Unlike prior art schemes which verify the activation ticket with traditional application processors, the present invention advantageously utilizes a secure element, which for reasons described in greater detail hereinafter, cannot be practically compromised.

Moreover, various aspects of the present invention address new problems unique to "virtualized" access client (e.g., eSIM) operation. Specifically, prior art UICC (smart cards) were designed to be freely moved between mobile devices; accordingly, the activation ticket could not depend on the UICC being a fixed component of the mobile device. In contrast, a permanently mounted secure element in combination with the activation ticket of the present invention can be used to e.g., enforce carrier locking, securely load SIM personalities, etc.

Various aspects of the present invention are broadly applicable to carrier locking, and have far reaching implications for business practices such as subsidation, unsubsidized operation, etc.

DETAILED DESCRIPTION OF EXEMPLARY EMBODIMENTS

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any wireless network (whether cellular or otherwise) that can benefit from controlling distribution of access clients to devices.

It will also be recognized that while the term "subscriber identity module" is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation

Within the context of prior art UMTS cellular networks, a user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. The USIM software is based on the Java Card™ programming language. Java Card™ is a subset of the Java™ programming language that has been modified for embedded "card" type devices (such as the aforementioned UICC).

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization the UICC can be distributed to subscribers.

Figure 1:
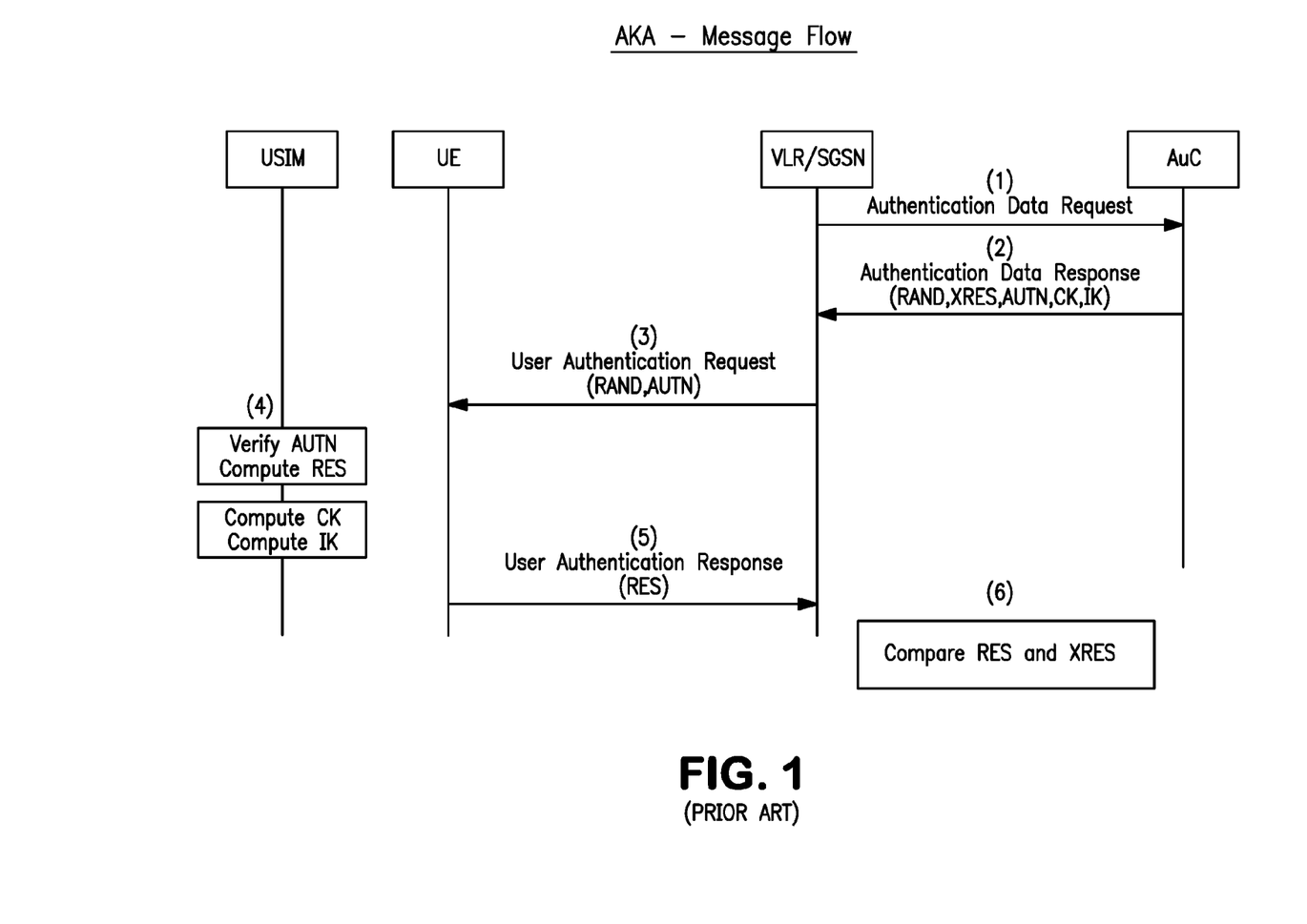
FIG. 1 graphically illustrates one exemplary Authentication and Key Agreement (AKA) procedure using a prior art USIM.

Referring now to FIG. 1, one exemplary Authentication and Key Agreement (AKA) procedure using the aforementioned prior art USIM is illustrated in detail. During normal authentication procedures, the UE acquires the International Mobile Subscriber Identify (IMSI) from the USIM. The UE passes the IMSI to the Serving Network (SN) of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE receives the RAND and AUTN, the USIM verifies if the received AUTN is valid. If so, the UE uses the received RAND to compute its own response (RES) using the stored K and the same algorithm that generated the XRES. The UE passes the RES back to the SN. The SN compares the XRES to the received RES and if they match, the SN authorizes the UE to use the operator's wireless network services.

Prior Art Carrier Locking

As a brief aside, when a prior art device initially powers up, the device executes a "chain of trust" boot sequence. As commonly used within the related arts, a chain of trust requires that the device only boot from software that is digitally signed. The signing authority will only sign boot programs that enforce security. The booted software can launch subsequent layers of software, where each layer is checked for a valid digital signature. Subsequently launched software can also launch additional layers of software, provided the software has a valid digital signature. If any constituent links have been maliciously modified the signature check will be invalid, and the launching software layer will abort execution. The trustworthiness of each layer is guaranteed by its antecedent layer, back to the original trusted boot software (thus, the "chain of trust").

Some solutions for carrier locking are based upon secure launching of the device software, which is based on the chain of trust. For example, as described in greater detail in U.S. Patent Publication Number 2009/0181662 filed on Jan. 13, 2009, and entitled "POSTPONED CARRIER CONFIGURATION", previously incorporated by reference in its entirety, one exemplary system for activating a device with a carrier network is based upon an "activation ticket" transaction. When the user purchases a mobile device from a network carrier, the SIM card associated with the carrier is installed in or comes with the mobile device. The user can activate the mobile device by, for example, connecting the mobile device to an access device (such as a personal computer, etc.) to access a mobile services application (e.g., iTunes™), which links to an activation service (e.g., iTunes Store™). An activation request is sent to the activation service that includes both a unique identifier (e.g., an IMEI) for the mobile device and one or more unique identifiers (e.g., an ICC-ID and/or an IMSI) for the installed SIM card.

The activation service maintains a relational database or registry of user information (e.g., ICC-ID, IMSI, etc.), and any other information needed to verify the legitimacy of the user. Using the database or registry, the activation service verifies, for example, that a particular mobile device with a particular IMEI with a particular SIM card was purchased by a particular user on a particular date, and that a specified carrier should be providing one or more services to the user, and the activation date of those services.

If the activation request is valid, the activation service then generates an activation ticket or record specific to the mobile device, which is provided to the mobile device from the mobile services application. The activation ticket or record is used by the device software to complete the activation process by, for example, verifying that the identifiers in the activation ticket or record match the identifiers for the mobile device and the installed SIM card. Once the activation is complete, the processors are enabled, allowing the device to function normally.

If the activation request is invalid (e.g., the registry of user information does not match the information received in the activation request from the mobile services application), the activation service witholds the activation ticket, and the processor(s) remain locked.

As previously alluded to, while the chain of trust works in theory, the size and complexity of higher layer software makes securing each subsequent layer exponentially more difficult. In practical implementation, security weaknesses in hardware and software of the devices are constantly being discovered, and exploited for malicious use. In some cases, a security hole at a high layer of software (e.g., software applications) can be used to subvert lower layer operation (e.g., boot sequence security checks). Once a device has been compromised, the software can be modified to disable the digital signature checks that evaluate and distinguish authorized or unauthorized software. For example, one common way to subvert existing carrier locking measures is to alter or remove the existing activation ticket step, such that the device no longer requires the activation ticket to operate with the specified carrier.

Apparatus

Accordingly, in one aspect of the present invention, a secure element of the device is additionally configured to verify or check the activation ticket. For example, in one embodiment, a virtualized UICC (eUICC) resident within the mobile device independently verifies the activation ticket. Unlike other processors of the mobile device (e.g., baseband processor, the application processor, etc.), the eUICC boots from a secure filesystem, and advantageously does not rely on a chain of trust for its operation (thereby removing opportunities for such a chain of trust to be exploited). Moreover, other processors are subjected to frequent updates, and/or new software from any number of third parties such as outside developers, whereas eUICC software is developed by only a small pool of trusted software developers, and carefully vetted.

Moreover, as previously noted, prior art solutions comprise a UICC (smart card) that can be freely moved between mobile devices. Thus, prior art UICC implementations cannot verify the activation ticket (as the activation ticket is specific to the mobile device, not the UICC). In contrast, various embodiments of the present invention have a permanently mounted eUICC component so as to frustrate removal from the mobile device. Hence, as described in greater detail subsequently herein, the eUICC provides a fixed secure element that is specific to the mobile device and can be used to e.g., enforce carrier locking, securely load SIM personalities, etc.

Figure 2:
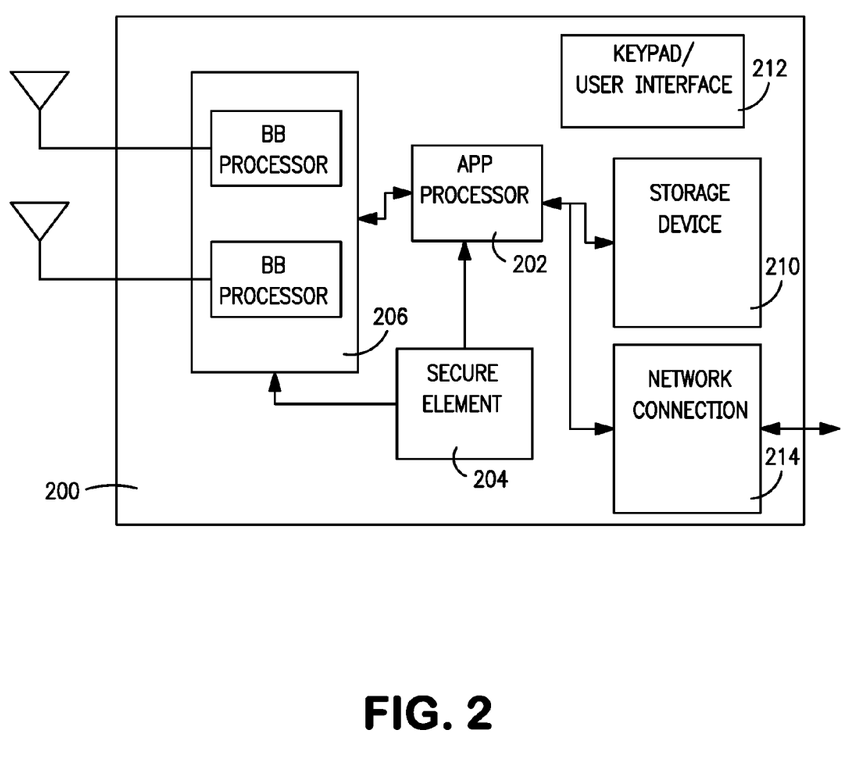
FIG. 2 is a block diagram of an exemplary apparatus useful for implementing the methods of the present invention.

Referring now to FIG. 2, one exemplary apparatus 200 useful for implementing the methods of the present invention is illustrated. The exemplary apparatus 200 includes an applications processor 202, a secure element 204, and one or more wireless interfaces and associated baseband processors 206.

As shown, the application processor 202 may comprise a digital signal processor, microprocessor, field-programmable gate array, or plurality of processing components mounted on one or more substrates. The processing subsystem may also comprise an internal cache memory. The processing subsystem is connected to a memory subsystem 210 comprising memory which may for example, comprise SRAM, flash and/or SDRAM components. The memory subsystem may implement one or a more of DMA type hardware, so as to facilitate data accesses as is well known in the art. The memory subsystem contains computer-executable instructions which are executable by the processor subsystem.

The secure element 204 includes a secure processor and associated secure storage. The secure storage contains computer-executable instructions which are executable by the secure processor. In one such incarnation, the secure element includes a virtualized Subscriber Identity Module operation, as described in co-owned, co-pending U.S. Provisional Patent Application Ser. No. 61/354,653 filed on Jun. 14, 2010 and entitled "METHODS FOR PROVISIONING SUBSCRIBER IDENTITY DATA IN A WIRELESS NETWORK", 61/366,505 filed on Jul. 21, 2010 and entitled "VIRTUAL SUBSCRIBER IDENTITY MODULE DISTRIBUTION SYSTEM", 61/407,858 filed on Oct. 28, 2010 and entitled "METHODS AND APPARATUS FOR ACCESS CONTROL CLIENT ASSISTED ROAMING", 61/407,861 filed on Oct. 28, 2010 and entitled "MANAGEMENT SYSTEMS FOR MULTIPLE ACCESS CONTROL ENTITIES", each previously incorporated by reference herein in its entirety.

Unlike the other processors of the device, the secure element is isolated from other software; in particular, the secure element is permanently or semi-permanently configured to execute a code base which is known to be secure. In some variants, the secure code base cannot be modified. In other variants, the secure code base can only be modified under strict conditions (e.g., connection to a trusted party such as the manufacturer, etc.)

The secure element includes a virtual or electronic entity such as e.g., a software application, hereafter referred to as an Electronic Universal Integrated Circuit Card (eUICC). In one such variant, eUICC is capable of storing and managing multiple SIM elements, referred hereafter as Electronic Subscriber Identity Modules (eSIMs). Each eSIM is a software emulation of a typical Subscriber Identity Module (SIM), and contains analogous programming and user data associated therewith. The eUICC selects an eSIM based upon the eSIM's ICC-ID, the selected eSIM enables the authentication procedure required to obtain wireless network services from the eSIM's corresponding network operator.

Moreover, it will be appreciated that eSIMs can be configured to operate according to a wide range of standards including without limitation the aforementioned USIM, CDMA Subscriber Identification Modules (CSIM), IP Multimedia Services Identity Module (ISIM), Subscriber Identity Modules (SIM), Removable User Identity Modules (RUIM), etc.

In one exemplary embodiment of the present invention, the apparatus 200 comprises one or more wireless interfaces and baseband processors 206 adapted to connect to one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems.

Additionally, in various embodiments, the apparatus 200 may comprise a user interface subsystem 212 including any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

The apparatus 200 may additionally comprise a network connection 214 suitable for accessing a mobile services application, such as for example the iTunes™ application developed and maintained by the Assignee hereof, the mobile services application being suitable for communicating with an activation service, such as the associated iTunes Store™. The mobile services application may be further adapted to complete or participate in activation ticket requests. For example, in one exemplary embodiment, an iTunes application running on a user's personal computer is configured to receive requests for activation; responsively, the iTunes application may connect to the iTunes Store™, and complete various aspects of the transaction (e.g., billing, account management, etc.).

In some variants, the mobile application is configured to receive and store activation tickets. Additionally, the mobile application may be further configured to transmit authentication requests. The mobile application may additionally comprise security measures, such as encryption, password access, etc. For example, as described in co-owned and co-pending U.S. Provisional Patent Application No. 61/472,109 filed on Apr. 5, 2011 and entitled "APPARATUS AND METHODS FOR STORING ELECTRONIC ACCESS CLIENTS" previously incorporated by reference in its entirety, a mobile application may include a database application for processing: (i) requests to store an eSIM, (ii) requests for a new or currently stored eSIM. The mobile application may also be responsible for verifying requests to ensure that communication is received from an entity authorized to make such a request. In one exemplary embodiment, the mobile application associates activation tickets with a user account, such that the account can activate phones with the associated activation tickets. For example, an iTunes account can be used to purchase an activation ticket for a purchased (but not activated) iPhone.

In alternate configurations, the apparatus 200 may directly access the activation service directly. For example, a native App Store™ application executed on the mobile device can be configured to access the iTunes Store™. Similarly, the native application may offer capabilities for storage, management, etc.

In one exemplary embodiment, the received activation ticket is verified for authenticity by at least the secure element 204. In one such implementation, the activation ticket includes a digital signature generated by a trusted signatory (e.g., an activation service). The activation ticket is encrypted via either an asymetric or symmetric cryptography scheme.

As is known by those of ordinary skill in the cryptographic arts, asymmetric key schemes use different keys to encrypt and decrypt messages, thus the encrypter and decrypter do not share the same key. Symmetric key schemes utilize the same key (or trivially transformed keys) for both encryption and decryption. The Rivest, Shamir and Adleman (RSA) algorithm is one type of public/private key pair cryptography that is commonly used, but it will be recognized that the present invention is in no way limited to the RSA algorithm. Public/private cryptography schemes can be used to encrypt a message, and/or generate signatures. Specifically, a message can be encrypted with a private key, and decrypted with the public key, thereby assuring that the message has not been altered in transit. Similarly, a signature generated with the private key can be verified with the public key, assuring that the entity generating the signature is legitimate. In both uses, the private key is kept hidden, and the public key is freely distributed.

Yet other forms of verification and protection for the activation ticket are further recognized by ones having ordinary skill in the related arts given the present disclosure. Other forms of cryptographic protection include, but are not limited to, block ciphers, stream ciphers, cryptographic hashes, etc.

An activation ticket may include a list of component specific identifiers, a verification mechanism, and appropriate formatting, etc. For example, one exemplary activation ticket implementation includes (i) eUICC identifier specific to the eUICC 204, (ii) a processor identifier specific to the application processor 202, (iii) one or more baseband identifiers specific to the baseband processors 206, (iv) a digital signature, and (v) a header indicating the issuer of the signature, and possibly signing algorithm, etc.

In some embodiments, the activation ticket records are configured to activate a specific component. For example, the activation ticket records will "un-break" at least the secure element 204. Additionally, the activation ticket may also include records for either or both of the application processor 202, and the baseband processor(s) 206. The activation ticket may be configured as a combined record (i.e., useful only for a combination of components). Alternately, the activation ticket is configured as a series of records for unbreaking the application processor and/or baseband processor, executed by the secure element. In such embodiments, the activation ticket includes records for either or both of the application processor 202, and the one or more baseband processors 206, which are verified and executed by the secure element.

More generally, the activation ticket may be checked by the secure element 204, where the secure element can enable or disable other components of the apparatus 200; or alternately, may be checked by each component individually, each component enabling or disabling further operation for itself.

In various other incarnations, the activation ticket enables limited operation of the device. For example, the activation ticket may enable, request and/or secure download of an eSIM for storage within the eUICC secure element. Thereafter, the eSIM can be used to procure access to the carrier network.

Methods

Figure 3:
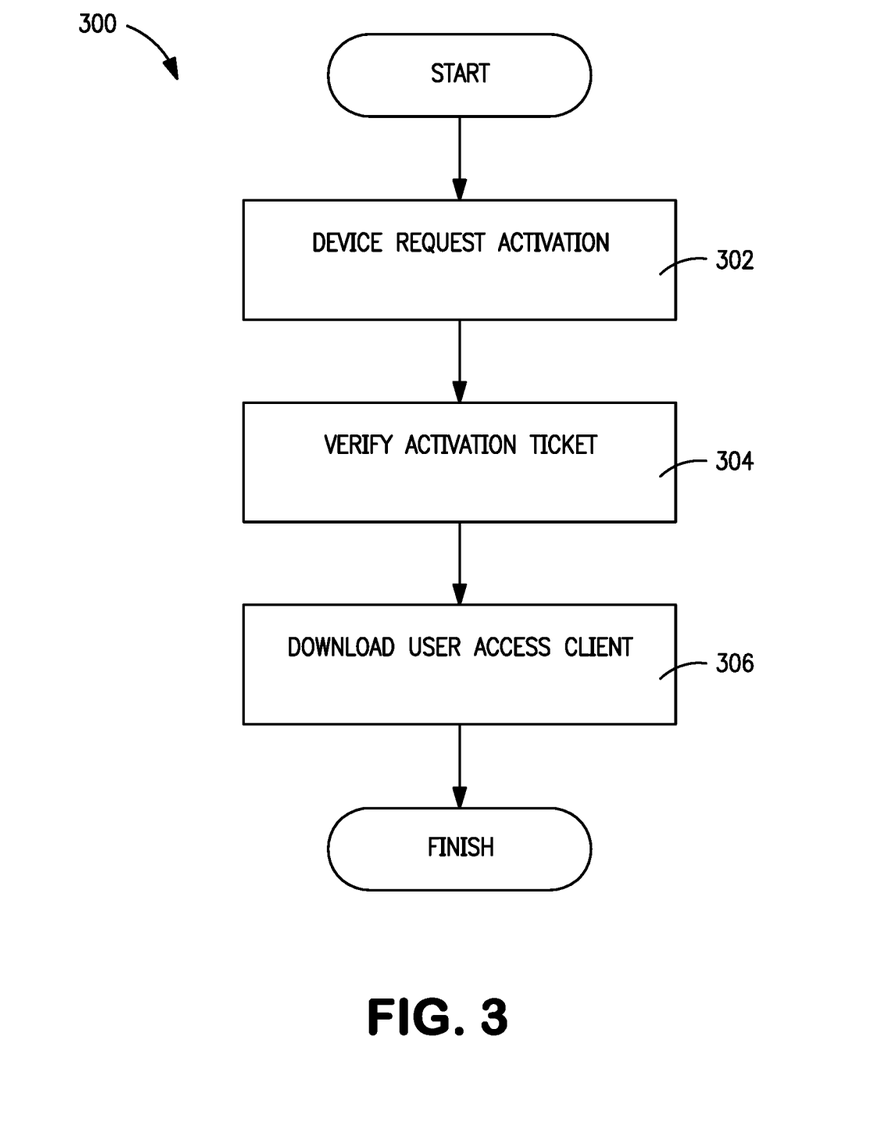
FIG. 3 is a logical flow diagram illustrating one embodiment of a method for controlling the distribution of user access clients to devices according to the invention.

Referring now to FIG. 3, one embodiment of a method 300 for controlling the distribution of user access clients to devices is shown and described. In one implementation of the invention, a device can only be unlocked with an activation ticket, where the activation ticket is verified by the secure element of the device. The secure element is secure from known practical attacks, and is not a removable fixture (in contrast to prior art removable circuit cards, which completely entrain the secure element, and were designed for removal, replacement, etc.). Moreover, the secure element is not issued an access client for a carrier network unless the secure element has been successfully unlocked with the activation ticket corresponding to the same carrier network. The exemplary methods described herein ensure that only access clients for networks assigned to the user device (e.g., UE) can be downloaded and used by the secure element.

Initially, a device is manufactured with a number of processors, at least one of these processors comprising a secure element (processor). Processor-specific information is stored within a tracking database. The tracking database may be maintained at the device manufacturer, or signatory authority or other designated entity. For example, in one exemplary embodiment, a centralized database operated by a trusted signatory (such as the Assignee hereof, or its designated proxy), receives and maintains device manufacture information.

The processor-specific information may further be organized in a set according to, e.g., device. In one variant, the set may be further characterized as a tuple of N size (tuples are ordered, and have a known number of elements). For instance, a mobile device that is manufactured with a secure element A, application processor B, and baseband processor C, would be identified uniquely with the specific triplet {A, B, C}. The set may include the unique identifier associated with the secure element. In one exemplary embodiment, a eUICC is uniquely identified by an eUICC identifier. Alternatively, the set may include information that is uniquely directed to the secure element e.g., a hash, signature, etc.

Thereafter, the device is allocated to one or more carrier networks. In certain business scenarios, this allocation can be based on one or more distribution channels (e.g., a device was sold to a customer from a network carrier kiosk, where the carrier kiosk is associated with a particular network carrier). Alternatively, this allocation can be based on business arrangements between the network carrier and the device manufacturer. For example, a specific carrier may pay a premium to a device manufacturer to offer exclusive service to a type of device.

In some cases, the device may be accepted with multiple different network carriers (e.g., the carrier identification may not be exclusionary of other carriers). Such embodiments may be of particular use where devices are sold and distributed to carriers which may have multiple partners or counterparts.

The set specific to the device is updated with the carrier designation. For example, the aforementioned device identified with the specific triplet {A, B, C} is updated with the allocated carrier network D; the resulting specific quadlet is {A, B, C, D}.

At step 302 of the method 300, the device requests activation. In one exemplary embodiment, the activation request is sent via a mobile services application (e.g., iTunes™) running on the device, which links to an activation service (e.g., iTunes Store™). The activation request includes information which matches, or can be trivially transformed to match, the set stored within the activation service. In one exemplary embodiment, the device may transmit an activation request comprising only a triplet {A, B, C}; this may be useful where the device has not been assigned a network carrier, or where the network carrier is not an option (i.e., all carrier accepted, no carriers accepted). For example, as described in U.S. Patent Publication Number 2009/0181662 entitled "POSTPONED CARRIER CONFIGURATION", previously incorporated herein, a telecommunications carrier is determined during activation of a mobile device (e.g., based on distribution channel, etc.).

Furthermore, as described in greater detail hereinafter, the mobile device may receive further operational restrictions as a condition of activation. For example, a customer that has purchased a device with a network subsidy may be further limited to a specific telecommunications network (or a set of telecommunications networks).

In alternate embodiments, the aforementioned user device (e.g., smartphone) transmits an activation request comprising the set {A, B, C, D} (i.e., specifying a desired telecommunications carrier) via one of its wireless links (which need not necessarily be the same wireless link being activated for service).

In one implementation, the activation service verifies that the activation set is valid. Validity can be determined in several ways, including but not limited to, one or more of (i) a verification of a digital security measure (e.g., a digital signature, key encryption, etc.), (ii) a verification of the number, and information stored within the activation set, (iii) a verification that the activation set is authorized, etc. Additionally, the activation service may check to ensure that the activation set has not already been registered.

Once successfully verified, the activation service provides the mobile device with an activation ticket. The activation ticket generally includes one or more "unbreak" records which are specific to a component of the device. In one such embodiment, the unbreak record includes a shared secret between the activation service and at least the secure element 204 (e.g., determined at time of manufacture). The unbreak record may additionally include additional secrets for other processing elements, etc. if desired.

In one exemplary configuration, the unbreak record includes a digital signature which can be verified by the target component (e.g., secure element). Alternatively, the unbreak record includes a response to a cryptographic challenge. Still other unbreak record types may include device-specific information, digital signatures, cryptographic elements such as residues or hashes, etc.

Yet other schemes for ensuring validity of the activation ticket will be appreciated by those having ordinary skill in the related arts given the present disclosure.

At step 304 of the method 300, the secure element resident within the device verifies the activation ticket. Unlike prior art solutions which rely on a processor executing a software application launched from a chain of trusted software, the secure element is a dedicated component which executes a known and secure software base. In one exemplary variant, the secure element is a secure processor emulating a virtualized Universal Integrated Circuit Card (UICC), referred to herein as an eUICC.

In some implementations, the activation ticket is independently verified at least in part by the associated components within the device which independently enable or disable their internal operation based on the activation ticket. For example, a baseband processor 206 of the device may independently verify its own unbreak record of the activation ticket. Alternatively, the activation ticket is verified by the secure element, the secure element enabling or disabling the associated components (e.g., baseband processor, application processor, etc.) based on the contents of the activation ticket. It is further envisioned that some embodiments of the present invention may only enable various portions of the device, leaving other portions disabled. Such selective enablement may be based on a variety of different schemes, such as according to service or subscription packages (e.g., only the device components needed to support the paid-for or subscribed services are enabled), network capabilities or configuration (e.g., only those device components which can be supported by extant network services or capabilities are enabled), and so forth.

For example, multiple baseband processors may be resident within a device, but only a limited subset of those are authorized for operation. Accordingly, a device manufacturer may make devices which are suitable for multiple network technologies; however, the device-specific activation ticket need only contain unbreak records for the baseband components necessary for use with the authorized network carrier (e.g., via a "carrier profile"), with a particular user profile, with a particular use profile (e.g., "work" or "personal"), or the like.

If the activation ticket is invalid, then the secure element can disable operation of the device, itself, or one or more other components. The disabling operation may be configured according to any number of different schemes, including for example (i) being permanent (i.e., completely unreversible under any circumstance), (ii) completely unreversible until one or more prescribed preconditions are met (such as insertion of a factory authorized code, expiration of a period of time, etc.), (iii) reversible as to only a subset of the components and/or functions that were attempted to be enabled using the invalid ticket), or (iv) completely reversible, depending on the particular implementation.

Any number of techniques may be used for such disablement consistent with the invention; common methods for disabling device operation include overwriting or modifying device software. For example, the secure element may delete the application processor source code. Other methods for disabling device operation may include tying components in reset, or in permanent inoperation. In yet other variants, the secure element may simply refuse to operate (which would disable wireless operation, but which would leave the remaining functionality of the device unaffected). In yet other approaches, the device/component(s) is/are temporarily disabled until they can be "unlocked" via entry of appropriate security information.

At step 306 of the method, an appropriate user access client in accordance with the activation ticket is downloaded, and enabled for the device. For example, as described in greater detail in U.S. Provisional Patent Application Ser. No. 61/354,653 filed on Jun. 14, 2010 and entitled "METHODS FOR PROVISIONING SUBSCRIBER IDENTITY DATA IN A WIRELESS NETWORK", and 61/366,505 filed on Jul. 21, 2010 and entitled "VIRTUAL SUBSCRIBER IDENTITY MODULE DISTRIBUTION SYSTEM", each previously incorporated herein by reference in its entirety, one such approach uses a virtualized USIM (eSIM) that is downloaded to the secure element (eUICC), enabling the mobile device to operate with the associated network per the previously describe SIM Authentication and Key Agreement (AKA) procedure, although it will be recognized that other approaches may be used with equal success.

In one exemplary embodiment, the secure element actively verifies that the user access client is acceptable. For example, in one implementation, the secure element continues to monitor one or more operational restrictions imposed as a condition of activation. For instance, a subsidized device may verify that all downloaded eSIMs are acceptable under the terms of use and/or device subsidy. Attempts to load an invalid and/or non-allowed eSIM will be ignored and/or flagged for further deterrence.

Example Operation

Figure 4:
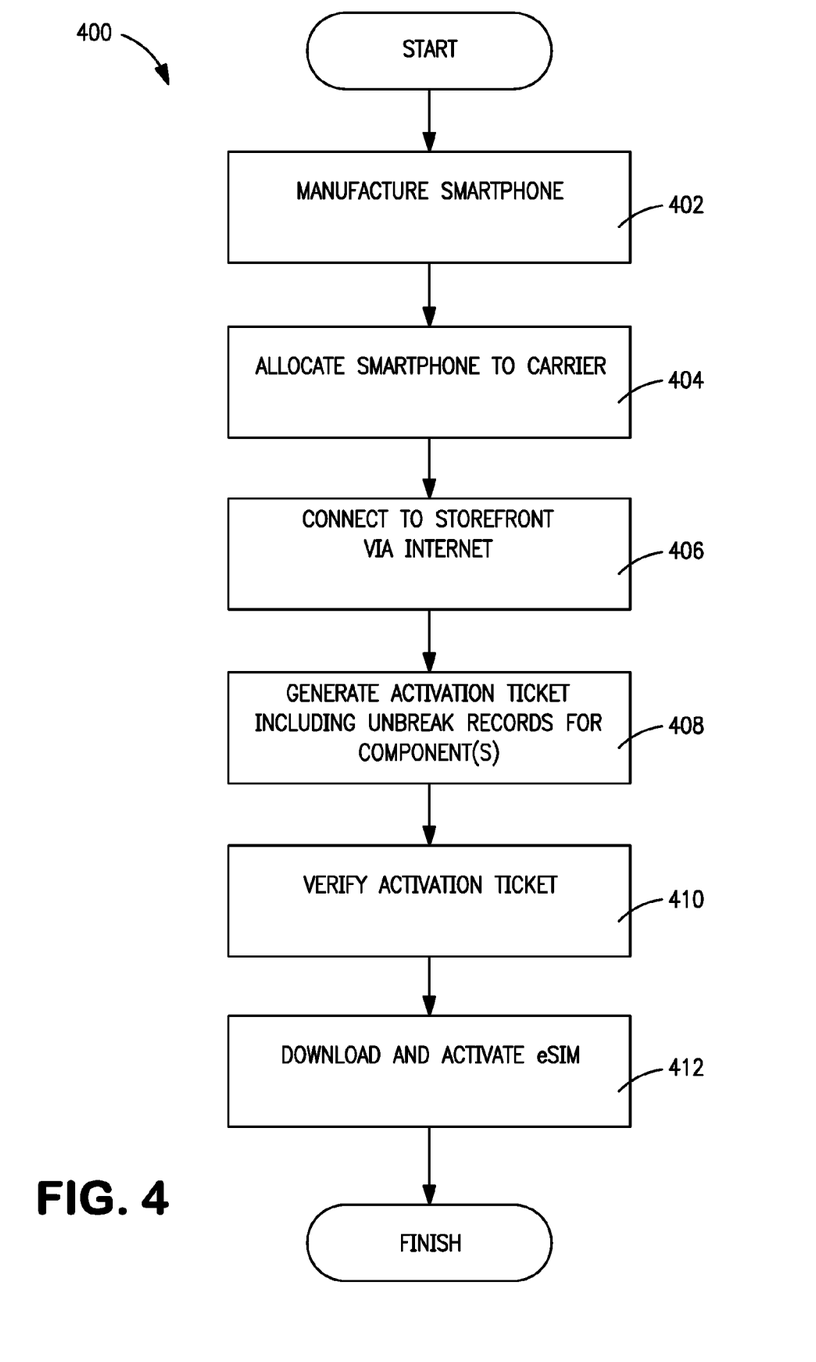
FIG. 4 is a logical flow diagram illustrating one embodiment of a method for controlling the distribution of user access clients to devices according to the invention.

FIG. 4 illustrates one particular implementation of the more generalized method 300 for activating a device described above with respect to FIG. 3.

At step 402 of the method 400, a smartphone (e.g., iPhone™ distributed by the Assignee hereof) is manufactured, and one or more device-specific identifiers and/or the device-specific configuration associated with that specific device is stored within a tracking database maintained by the Assignee or its designated proxy.

At step 404, the smartphone is assigned to one or more valid carriers or service providers. The assignment is based on, inter alia, the relevant distribution channel (e.g., purchased from a carrier owned/operated store or kiosk). The tracking database is updated with the assigned one or more valid carriers.

When the subscriber subsequently attempts to activate the smartphone (step 406) via an online service or storefront, such as e.g., the iTunes Store™ operated by the Assignee hereof, the tracking database generates an activation ticket per step 408. The generation of the activation ticket is in this implementation made contingent upon the subscriber providing additional information, such as finalizing billing information, etc. Various other schemes useful in postponed activation of a device are described in U.S. Patent Publication Number 2009/0181662 filed on Jan. 13, 2009, and entitled "POSTPONED CARRIER CONFIGURATION", previously incorporated by reference in its entirety.

The activation ticket includes a so-called "unbreaking record" for the various components of the particular smartphone, as determined by the tracking database. In this embodiment, only the tracking database has the manufacturing information; accordingly, only the tracking database can generate the activation ticket, thereby adding an additional level of security. In this example, the unbreaking record is generated for the device application processor, the device baseband processor corresponding to the assigned carrier network, and the device eUICC secure element.

At step 410, the smartphone receives the activation ticket and extracts the unbreaking records. The unbreaking records unlock the corresponding processors and secure element, and thereafter the smartphone can start or resume normal operation. For example, as shown at step 412, the device eUICC downloads an eSIM for normal operation.

Business Considerations

Various aspects of the present invention may further be used to implement or enforce new business models and or strategies. Firstly, network operators can enforce existing carrier subsidy locks with much greater success than through use of prior art techniques. Presumably, better subsidy locking capabilities are desirable, and worth a premium. Hence, such improved subsidy locks can be offered to e.g., network operators (or even end users) as an incentive or for additional consideration.

In addition, device manufacturers can manufacture the same device for multiple network carriers, enforcing subsidy lock at the activation service (rather than enforcing subsidy lock at the device). Accordingly, network carriers can order devices on an as-needed basis (rather than in large inventories which need to be carefully managed). The manufacture of such "fungible" or universal devices also reduces manufacturing and inventory management costs for the device manufacturer or provider, since individual device-specific manufacturing and inventory channels need not be maintained.

Moreover, each carrier or service provider can fine-tune their subsidy offerings (e.g., one year subsidy, two year subsidy, non-subsidized, etc.) Network carriers will be able to compete not only on the types of services offered, but also on the length of service contracts, the types of contracts, etc.

Still further, various aspects of the present invention may be used to enable better control over device security. Devices which have been stolen or misplaced can be sent a deactivation ticket that "bricks" the device or otherwise disables the device or portions thereof. Such a service could ensure that customer personal data (including that resident on the device itself) remains inaccessible to would-be-thieves or other surreptitious users.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A mobile device configured to selectively enable and disable different hardware components included in the mobile device, the mobile device comprising:
   a wireless interface; and
   a secure element, wherein the secure element includes:
      an interface to different hardware components included in the mobile device;
      a secure processor;
      a first secure storage configured to store at least one access control client that enables the mobile device to access services provided by a cellular network associated with the at least one access control client; and
      a second secure storage configured to store instructions that, when executed by the secure processor, cause the secure processor to carry out operations that include:
         verifying activation information that specifies at least one limitation for operating the mobile device to be enforced by the secure element, wherein the activation information includes at least one record, and each record:
            corresponds to a hardware component of the different hardware components,
            includes a shared secret associated with the hardware component, and
            indicates whether to enable or disable the hardware component; and
         upon verifying the activation information:
            downloading an access control client,
            storing the access control client in the first secure storage, and for each record included in the activation information:
               causing an enablement or a disablement of the hardware component in accordance with the record and in response to a verification of the shared secret by the hardware component.

2. The mobile device of claim 1, wherein the different hardware components included in the mobile device are selected from a group that includes: the first secure storage, an application processor, and the wireless interface.

3. The mobile device of claim 2, wherein the wireless interface includes a first baseband processor and a second baseband processor that is different from the first baseband processor, and the group further includes: the first baseband processor and the second baseband processor.

4. The mobile device of claim 1, wherein the activation information includes a digital signature that is associated with a trusted signatory entity.

5. The mobile device of claim 4, wherein verifying the activation information comprises verifying the digital signature.

6. The mobile device of claim 1, wherein the at least one access control client comprises an electronic Subscriber Identity Module (eSIM) that is specific to the cellular network.

7. The mobile device of claim 1, wherein the operations further comprise:
   issuing, to the cellular network, a request to register to access the services provided by the cellular network; and
   receiving, from the cellular network, the activation information in response to the request.

8. The mobile device of claim 1, wherein each of the activation information and the access control client is received via the wireless interface.

9. A hardware secure element included in a mobile device, the hardware secure element comprising:
   an interface to different hardware components included in the mobile device;
   a secure processor;
   a first secure storage configured to store at least one access control client that enables the mobile device to access services provided by a cellular network associated with the at least one access control client; and
   a second secure storage configured to store instructions that, when executed by the secure processor, cause the secure processor to carry out operations that include:
      verifying activation information that specifies at least one limitation for operating the mobile device to be enforced by the hardware secure element, wherein the activation information includes at least one record, and each record:
         corresponds to a hardware component of the different hardware components,
         includes a shared secret associated with the hardware component, and
         indicates whether to enable or disable the hardware component; and
      upon verifying the activation information:
         downloading an access control client,
         storing the access control client in the first secure storage, and for each record included in the activation information:
    causing an enablement or a disablement of the hardware component in accordance with the record and in response to a verification of the shared secret by the hardware component.

10. The hardware secure element of claim 9, wherein the different hardware components included in the mobile device are selected from a group that includes: the first secure storage, an application processor, and a wireless interface in the mobile device.

11. The hardware secure element of claim 10, wherein the wireless interface includes a first baseband processor and a second baseband processor that is different from the first baseband processor, and the group further includes: the first baseband processor and the second baseband processor.

12. The hardware secure element of claim 9, wherein the activation information includes a digital signature that is associated with a trusted signatory entity.

13. The hardware secure element of claim 12, wherein verifying the activation information comprises verifying the digital signature.

14. The hardware secure element of claim 9, wherein the at least one access control client comprises an electronic Subscriber Identity Module (eSIM) that is specific to the cellular network.

15. The hardware secure element of claim 9, wherein the operations further comprise:
    issuing, to the cellular network, a request to register to access the services provided by the cellular network; and
    receiving, from the cellular network, the activation information in response to the request.

16. A method for selectively enabling and disabling different hardware components included in a wireless device, the method comprising:
    at a secure element included the wireless device:
        receiving activation information that specifies at least one limitation for operating the wireless device to be enforced by the secure element, wherein the activation information includes at least one record, and each record:
            corresponds to a hardware component of the different hardware components,
            includes a shared secret associated with the hardware component, and
            indicates whether to enable or disable the hardware component;
        verifying the activation information; and
        upon verifying the activation information:
            downloading an access control client that enables the wireless device to access services provided by a cellular network associated with the access control client,
            storing the access control client in a first secure storage included in the secure element, and
            for each record included in the activation information:
                causing an enablement or a disablement of the hardware component in accordance with the record and in response to a verification of the shared secret by the hardware component.

17. The method of claim 16, wherein the different hardware components included in the wireless device are selected from a group that includes: the first secure storage, an application processor, and a wireless interface in the wireless device.

18. The method of claim 17, wherein the wireless interface includes a first baseband processor and a second baseband processor that is different from the first baseband processor, and the group further includes: the first baseband processor and the second baseband processor.

19. The method of claim 16, wherein the activation information includes a digital signature that is associated with a trusted signatory entity; and
    wherein verifying the activation information comprises verifying the digital signature.

20. The method of claim 16, wherein the access control client comprises an electronic Subscriber Identity Module (eSIM) that is specific to the cellular network.

\* \* \* \* \*